(12) United States Patent
Monden

(10) Patent No.: US 8,605,962 B2
(45) Date of Patent: Dec. 10, 2013

(54) PATTERN MATCHING SYSTEM, PATTERN MATCHING METHOD, AND PATTERN MATCHING PROGRAM

(75) Inventor: Akira Monden, Tokyo (JP)

(73) Assignee: NEC Corporation, Tokyo (JP)

(*) Notice: Subject to any disclaimer, the term of this patent is extended or adjusted under 35 U.S.C. 154(b) by 614 days.

(21) Appl. No.: 12/863,709

(22) PCT Filed: Nov. 28, 2008

(86) PCT No.: PCT/JP2008/071671
§ 371 (c)(1),
(2), (4) Date: Oct. 4, 2010

(87) PCT Pub. No.: WO2009/093381
PCT Pub. Date: Jul. 30, 2009

(65) Prior Publication Data
US 2011/0019918 A1    Jan. 27, 2011

(30) Foreign Application Priority Data
Jan. 21, 2008   (JP) ................................ 2008-010818

(51) Int. Cl.
*G06K 9/62*    (2006.01)
(52) U.S. Cl.
USPC ........................................................ 382/125
(58) Field of Classification Search
None
See application file for complete search history.

(56) References Cited

U.S. PATENT DOCUMENTS

| 5,937,082 | A | 8/1999 | Funada | |
|---|---|---|---|---|
| 2003/0021452 | A1* | 1/2003 | Hamid | 382/124 |

FOREIGN PATENT DOCUMENTS

| JP | 3-248278 A | 11/1991 |
|---|---|---|
| JP | 7-271981 A | 10/1995 |
| JP | 9-147120 A | 6/1997 |
| JP | 9-167230 A | 6/1997 |
| JP | 11-25268 A | 1/1999 |
| JP | 2000-057343 A | 2/2000 |
| JP | 2002-163654 A | 6/2002 |
| JP | 2003-233816 A | 8/2003 |
| JP | 2004-110839 A | 4/2004 |
| JP | 2005-63297 A | 3/2005 |
| JP | 2005-258555 A | 9/2005 |
| JP | 2005-352712 A | 12/2005 |
| JP | 2006-59282 A | 3/2006 |
| JP | 2006-092396 A | 4/2006 |

(Continued)

OTHER PUBLICATIONS

International Preliminary Report on Patentability (PCT/IPEA/409) issued on Sep. 16, 2010 in the International Patent Application No. PCT/JP2008/071671.

(Continued)

*Primary Examiner* — Brian P Werner
(74) *Attorney, Agent, or Firm* — Sughrue Mion, PLLC

(57) ABSTRACT

A problem to be solved is to provide a pattern matching system and the like which can match patterns including time change with high accuracy and safety. The problem can be solved by a pattern matching system which includes a template storage unit, a feature extraction unit, and a matching unit. The template pattern stores a template pattern. The feature extraction unit extracts features of an input pattern. The matching unit performs a first matching in which a first feature not changing with time among the features of the input pattern is matched with the template pattern and performs a second matching other than the first matching, in which a second feature changing with time among the features of the input pattern is matched with the template pattern.

9 Claims, 15 Drawing Sheets

(56) References Cited

FOREIGN PATENT DOCUMENTS

| JP | 2006-092491 A | 4/2006 |
|----|---------------|--------|
| JP | 2006-107288 A | 4/2006 |
| JP | 2007-140823 A | 6/2007 |
| JP | 2007-213126 A | 8/2007 |
| WO | WO 2005/122896 A1 | 12/2005 |

OTHER PUBLICATIONS

Written Opinion of the International Preliminary Examination Authority (PCT/IPEA/408) issued on May 26, 2009 in the International Patent Appliction No. PCT/JP2008/071671.

* cited by examiner

| FEATURE NUMBER | INITIAL POINT COORDINATE | END POINT COORDINATE | CHANGE WITH TIME |
|---|---|---|---|
| 1 | (100, 120) | (120, 130) | YES |
| 2 | (110, 140) | (190, 165) | NO |
| ⋮ | ⋮ | ⋮ | ⋮ |
| 33 | (80, 93) | (341, 418) | YES |

PATTERN MATCHING SYSTEM, PATTERN MATCHING METHOD, AND PATTERN MATCHING PROGRAM

TECHNICAL FIELD

The present invention relates to a pattern matching system, a pattern matching method, and a pattern matching program, and more particularly, to a pattern matching system, a pattern matching method, and a pattern matching program for matching patterns including both of a feature changing with time and a feature not changing with time.

BACKGROUND ART

In pattern matching to determine whether or not two patterns are identical to each other, the pattern to be matched may include both of a feature changing with time and a feature not changing with time. In such a case of matching the patterns including both of the feature changing with time and the feature not changing with time, there is a problem that if two patterns are obtained at a considerably long interval, the feature changing with time changes, which makes it difficult to perform the matching.

For example, in a case of matching finger surface patterns, a finger surface pattern to be matched includes both of a feature as fingerprint ridges, which does not change with time, and a feature of wrinkles, scars, or roughness on a finger surface, which changes with time. For personal identification, a finger surface pattern at some time point is registered as a template, at a later date, for reference, a finger surface pattern taken at the time may be compared with the template. However, if a time interval between the registration and the reference is long, since the feature of wrinkles, scars, or roughness has changed, there is a risk that the finger surface pattern at the reference may be judged to be a pattern different from the finger surface pattern of the template, even though the both are taken from a finger of a same person. On the other hand, if an allowable error is set large such that the features changing with time are judged to be identical, a risk rises that a finger surface pattern of another person is judged to be a pattern identical to the template.

As a method for dealing with such a problem, there is a method that uses only features not changing with time for evaluation. For example, a fingerprint/palmprint image processing device described in Japanese patent publication (JP-A-Heisei 9-167230) is configured to extract only ridge features that do not change with time. As described, by using only features not changing with time for matching, it is not necessary to worry about time change of the feature, and therefore patterns taken at a long interval can be matched. However, it is difficult to match patterns including a feature changing with time with a high accuracy. That is, as described in Japanese patent publication (JP-A-Heisei 9-167230), if features used for matching are limited to features not changing with time in order to eliminate an influence of features changing with time, amount of information usable for the matching is reduced. There is also a case that a combination of the features changing with time and the features not changing with time provides sufficient amount of information for matching, but only the features not changing with time provide insufficient amount of information. In this case, by matching only the features not changing with time, high accuracy matching cannot be performed. For example, in a case that a method described in Japanese patent publication (JP-A-Heisei 9-167230) is used and that features to be used for matching are limited to ridge features, if a region from which ridges can be extracted is small due to an influence of wrinkles, scars or the like, ridges sufficient for the matching cannot be obtained, and matching accuracy is reduced.

As another method for dealing with time change of a pattern, there is a method in which a template registered at some time point is not used after long time has elapsed, but updated at constant interval or for each matching. For example, according to a personal authentication apparatus described in Japanese patent publication (JP-P2006-092491A), by using a matching result for data obtained from image data which is took at the last authentication, an authentication is possible even if a pattern has changed with time. However, in a method described in Japanese patent publication (JP-P2006-092491A), it is difficult to safely perform matching. That is, in a method in which a template to be compared is update as described in Japanese patent publication (JP-P2006-092491A) in order to eliminate an influence of pattern change due to the change with time, there is a risk that a different pattern may be registered as the template. Once the different pattern is erroneously authenticated as an identical pattern, the erroneously authenticated pattern is registered as the template at the update of template. For example, in the method described in Japanese patent publication (JP-P2006-092491A), since matching is carried out by using an image having succeeded in authentication at the last time, a single erroneous authentication causes that the erroneously authenticated pattern is used as a correct registration pattern next time or later. Thus, there is a risk that a template is erroneously updated, and it is difficult to safely perform matching.

According to a personal identification system based on a fingerprint described in Japanese patent publication (JP-P2004-110839A), a fingerprint which is registered for the first time and a fingerprint which is matched for the last time are saved. Then, by performing matching by using each of them, matching is possible even if a pattern has changed with time. A method described in Japanese patent publication (JP-P2004-110839A) attempts to achieve both of robustness to pattern change and safeness of matching by performing comparison by using each of the fingerprint registered for the first time and the fingerprint matched for the last time. However, if a pattern has changed, the pattern cannot be directly matched with the fingerprint registered for the first time. For this reason, in a case that the pattern is not judged to be identical if the matching with the fingerprint registered for the first time cannot be performed, the robustness to the pattern change is not achieved. If only a result of matching with the fingerprint matched for the last time is used in order to achieve the robustness to the pattern change, similarly to Japanese patent publication (JP-P2006-092491A), there is a risk that an erroneous pattern may be registered. Even when the method described in Japanese patent publication (JP-P2004-110839A) is used, it is still difficult to achieve matching of a pattern including time change with both of high accuracy and safety.

Japanese patent publication (JP-A-Heisei 11-025268) describes an invention of a fingerprint matching device that separately stores features in a feature information main storage unit and a feature information sub storage unit. The fingerprint matching device performs updating in order to store better features and improve a matching performance. The reason why the features are stored in the two storage unit is to update the information stored in the main storage unit when a specific condition is satisfied.

DISCLOSURE OF INVENTION

An object of the present invention is to provide a pattern matching system and the like that can match patterns including time change with high accuracy and safety.

In a first aspect of the present invention, a pattern matching system includes a template storage unit, a feature extraction unit, and a matching unit. The template storage unit stores a template pattern. The feature extraction unit extracts features of an input pattern. The matching unit performs a first matching in which a first feature not changing with time among the features of the input pattern is matched with the template pattern and performs a second matching other than the first matching, in which a second feature changing with time among the features of the input pattern is matched with the template pattern.

In a second aspect of the present invention, a matching method includes storing, extracting, and matching. In the storing, a template pattern is stored. In the extracting, features of an input pattern are extracted. In the matching, the features of the input pattern are matched with the template pattern. The matching includes a first matching in which a first feature not changing with time among the features of the input pattern is matched with the template pattern, and a second matching other than the first matching, in which a second feature changing with time among the features of the input pattern is matched with the template pattern.

In a third aspect of the present invention, a pattern matching program causes a computer to implement a feature extraction unit and a matching unit. The feature extraction unit extracts features of an input pattern. The matching unit performs a first matching in which a first feature not changing with time among the features of the input pattern is matched with a template pattern stored in a template storage unit, and performs a second matching other than the first matching, in which a second feature changing with time among the features of the input pattern is matched with the template pattern.

According to the present invention, there is provided a pattern matching system and the like that can match patterns including time change with high accuracy and safety.

BEST MODE FOR CARRYING OUT THE INVENTION (First Exemplary Embodiment)

Figure 1:
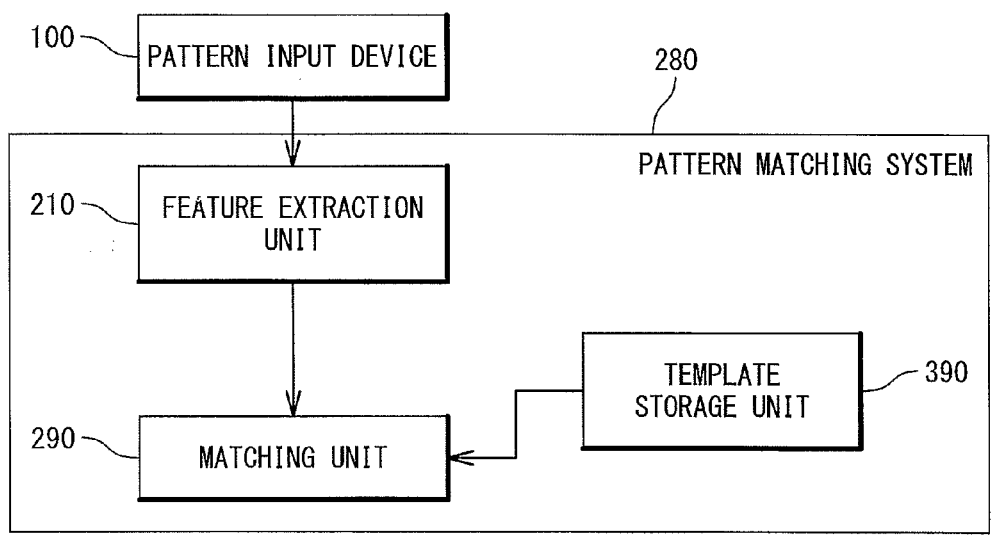
FIG. 1 is a block diagram illustrating a configuration according to a first exemplary embodiment of the present invention.
Figure 2:
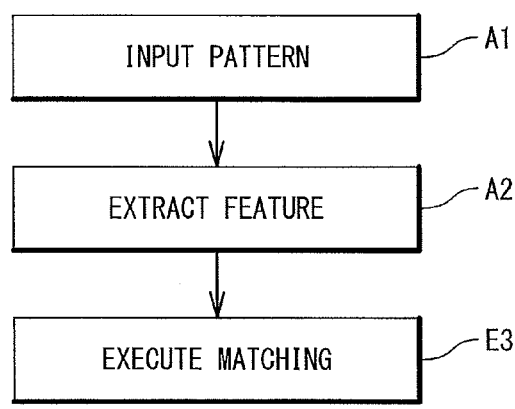
FIG. 2 is a flowchart illustrating operation according to the first exemplary embodiment of the present invention.

An exemplary embodiment of the present invention is described in detail referring to FIGS. 1 and 2. Referring to FIG. 1, a pattern matching system 280 according to a first exemplary embodiment of the present invention includes a template storage unit 390, a feature extraction unit 210, and a matching unit 290. The feature extraction unit 210 and the matching unit 290 can be implemented by a computer that operates based on a program control in accordance with a pattern matching program. The pattern matching system 280 is connected to a pattern input device 100.

The pattern input device 100 inputs a pattern to be matched. The template storage unit 390 stores features of a template pattern in a form that allows distinguish between a feature which may change with time and a feature which does not change with time. The feature extraction unit 210 extracts features to be used for matching from the input pattern inputted by the pattern input device 100. The matching unit 290 matches the input pattern with the template pattern. When the matching unit 290 matches the features of the input pattern with the features of the template pattern, the matching unit 290 separately performs the matching depending on whether a feature may change with time or does not change with time.

Referring to a configuration diagram of FIG. 1 and a flowchart of FIG. 2, the entire operation of the pattern matching system according to the first exemplary embodiment is described in detail. When the pattern input device 100 inputs the pattern to be matched (Step A1 in FIG. 2), the feature extraction unit 210 extracts the features to be used for matching from the input pattern (Step A2 in FIG. 2). The matching unit 290 matches the features of the input pattern with the features of the template pattern, which is stored in the template storage unit 390. At this time, the matching unit 290 separately matches the input pattern with the template pattern depending on whether a feature may change with time or does not change with time (Step E3 in FIG. 2).

Advantages of the first exemplary embodiment are described. According to the first exemplary embodiment, the template storage unit 390 stores the features of the template pattern in the form that enables distinguish between a feature which may change with time and a feature which does not change with time. The matching unit 290 separately matches the input pattern with the template pattern depending on whether the feature may change with time or does not change with time. For this reason, even when the pattern changes with time, matching can be performed without any risk of reducing accuracy to cope with the time change or of erroneously updating the template.

(Second Exemplary Embodiment)

Figure 3:
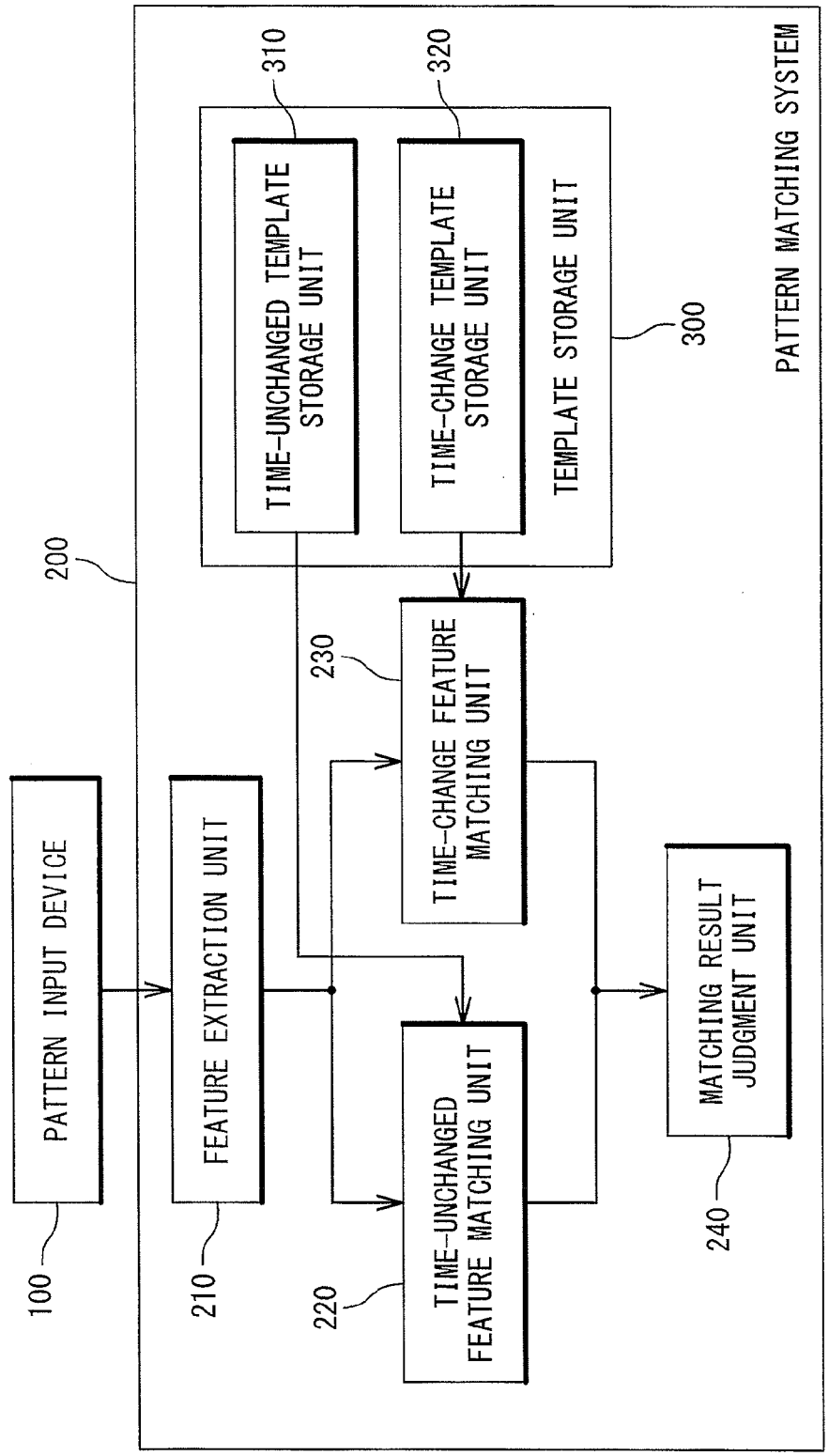
FIG. 3 is a block diagram illustrating a configuration according to a second exemplary embodiment of the present invention.
Figure 4:
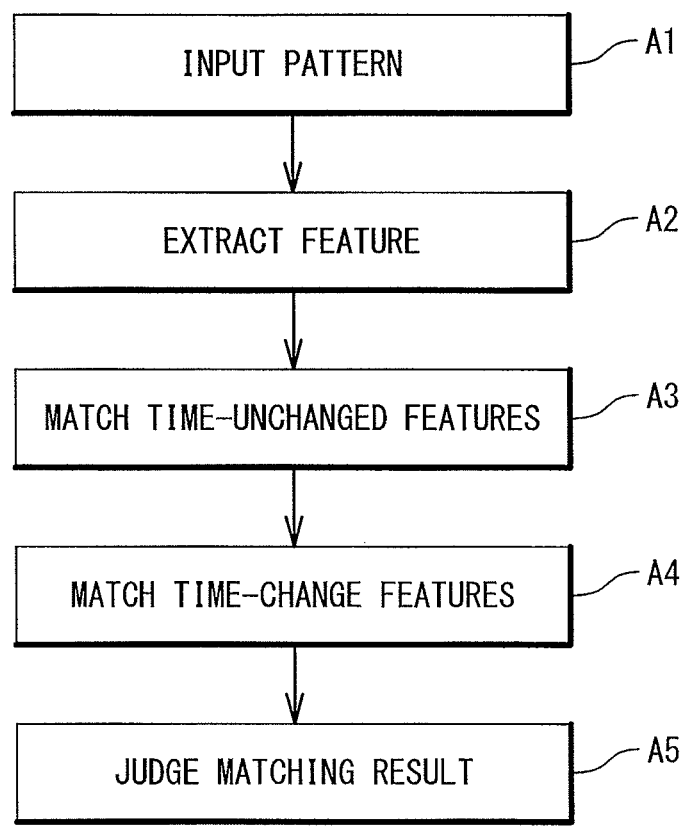
FIG. 4 is a flowchart illustrating operation according to the second exemplary embodiment of the present invention.

Next, another exemplary embodiment of the present invention is described in detail referring to FIGS. 3 and 4. Referring to FIG. 3, a pattern matching system 200 according to a second exemplary embodiment of the present invention includes a template storage unit 300, the feature extraction unit 210, a time-unchanged feature matching unit 220, a time-change feature matching unit 230, and a matching result judgment unit 240. The template storage unit 300 includes a time-unchanged template storage unit 310 and a time-change template storage unit 320. The feature extraction unit 210, the time-unchanged feature matching unit 220, the time-change feature matching unit 230, and the matching result judgment unit 240 can be implemented by a computer that operates based on a program control in accordance with a pattern matching program. The pattern matching system 200 is connected to the pattern input device 100.

The time-unchanged template storage unit 310 stores a feature which does not change with time among features of a template pattern. The time-change template storage unit 320 stores a feature that changes with time among the features of the template pattern. The time-unchanged feature matching unit 220 matches a feature of an input pattern with the time-unchanged feature of the template pattern, which is stored in the time-unchanged template storage unit 310. The time-change feature matching unit 230 matches a feature of the input pattern with the time-change feature of the template pattern, which is stored in the time-change template storage unit 320. The matching result judgment unit 240 judges based on a matching result of the time-unchanged feature matching unit 220 and a matching result of the time-change feature matching unit 230, whether or not the input pattern and the template pattern have identity.

Referring to a configuration diagram of FIG. 3 and a flowchart of FIG. 4, the entire operation according to the second exemplary embodiment is described in detail. When the pattern input device 100 inputs the pattern to be matched (Step A1 in FIG. 4), the feature extraction unit 210 extracts the features to be used for matching from the input pattern (Step A2 in FIG. 4). The time-unchanged feature matching unit 220 matches the feature of the input pattern with the time-unchanged feature of the template, which is stored in the time-unchanged template storage unit 310 (Step A3 in FIG. 4). The time-change feature matching unit 230 matches the feature of the input pattern with the time-change feature of the template, which is stored in the time-change template storage unit 320 (Step A4 in FIG. 4). The matching result judgment unit 240 judges based on the matching result of the time-unchanged feature matching unit 220 and the matching result of the time-change feature matching unit 230, whether or not the input pattern and the template pattern have identity (Step A5 in FIG. 4). Note that, in the example of FIG. 4, Step A4 is performed after Step A3; however, Step A4 may be performed before Step A3, or Steps A3 and A4 may be performed in parallel.

Advantages of the second exemplary embodiment are described. According to the second exemplary embodiment, the time-unchanged template storage unit 310 stores the feature not changing with time, and the time-unchanged feature matching unit 220 matches the features not changing with time. Also, the time-change template storage unit 320 stores the feature changing with time, and the time-change feature matching unit 230 matches the features changing with time. Then, the matching result judgment unit 240 determines, from the matching result for the features not changing with time and the matching result for the features changing with time, whether or not the input pattern and the template patter have identity. As described, since the feature not changing with time and the feature changing with time are separately handled, expression, storage, evaluation, and the like suitable for each of the feature changing with time and the feature not changing with time can be performed.

(Third Exemplary Embodiment)

Figure 5:
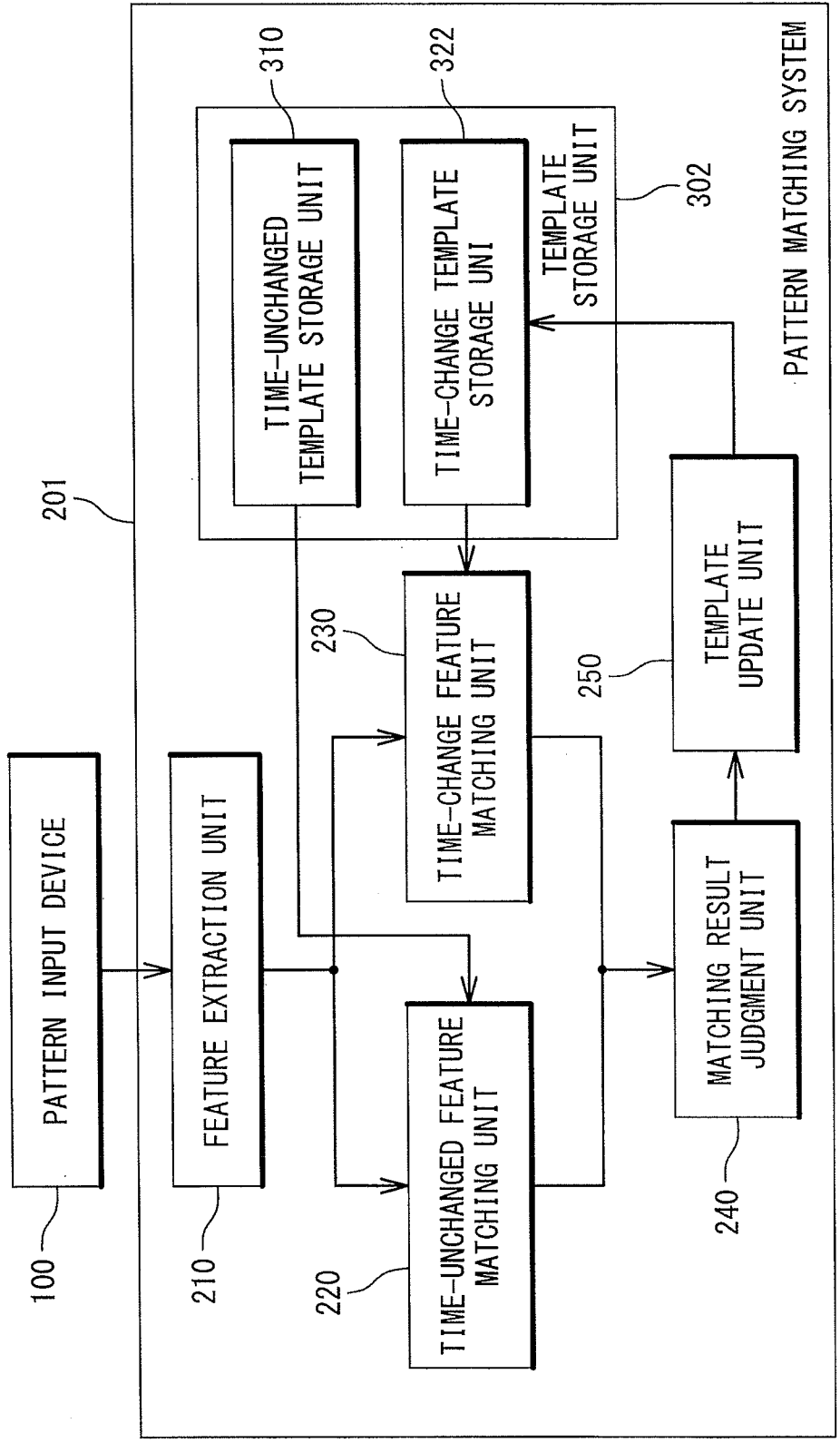
FIG. 5 is a block diagram illustrating a configuration according to a third exemplary embodiment of the present invention.
Figure 6:
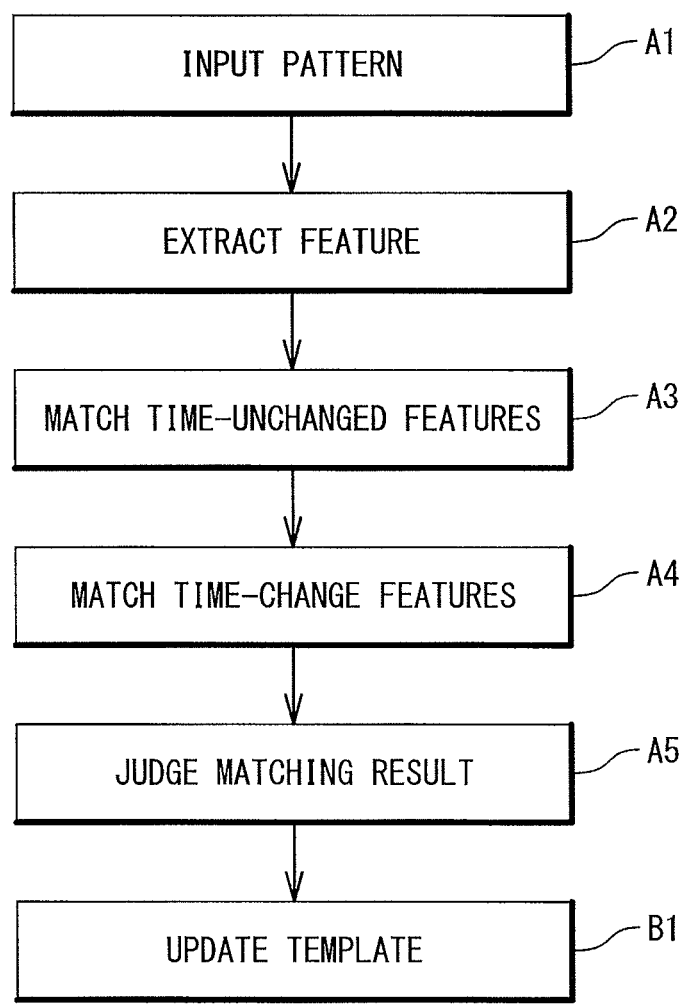
FIG. 6 is a flowchart illustrating operation according to the third exemplary embodiment of the present invention.

Next, still another exemplary embodiment of the present invention is described in detail referring to FIGS. 5 and 6. Referring to FIG. 5, a pattern matching system 201 according to a third exemplary embodiment of the present invention has a configuration in which a template update unit 250 is added to the pattern matching system 200 according to the second exemplary embodiment. When the matching result judgment unit 240 judges that the input pattern and the template pattern have identity, the template update unit 250 updates the time-change template stored in the time-change template storage unit 322 of the template storage unit 302 with use of the time-change feature of the input pattern used for the matching.

Referring to a configuration diagram of FIG. 5 and a flowchart of FIG. 6, the entire operation according to the third exemplary embodiment is described in detail. Referring to the flowchart of FIG. 6, the entire operation according to the third exemplary embodiment is operation in which the flowchart of FIG. 4 is added with Step B1 of updating template. When the input pattern and the template pattern are judged to have identity in Step A5 in FIG. 6, according to the third exemplary embodiment, the time-change template stored in the time-change template storage unit 322 is updated with use of the time-change feature of the input pattern which is used for the matching (Step B1 in FIG. 6). Note that, similarly to the second exemplary embodiment, an order of Steps A3 and A4 in FIG. 6 may be different from that shown in FIG. 6.

Advantages of the third exemplary embodiment are described. According to the third exemplary embodiment, the template update unit 250 updates the time-change feature of the template, which is stored in the time-change template storage unit 322. For this reason, even if a pattern changes with time to become largely different from an initial pattern, matching can be performed with high accuracy.

(Fourth Exemplary Embodiment)

Figure 7:
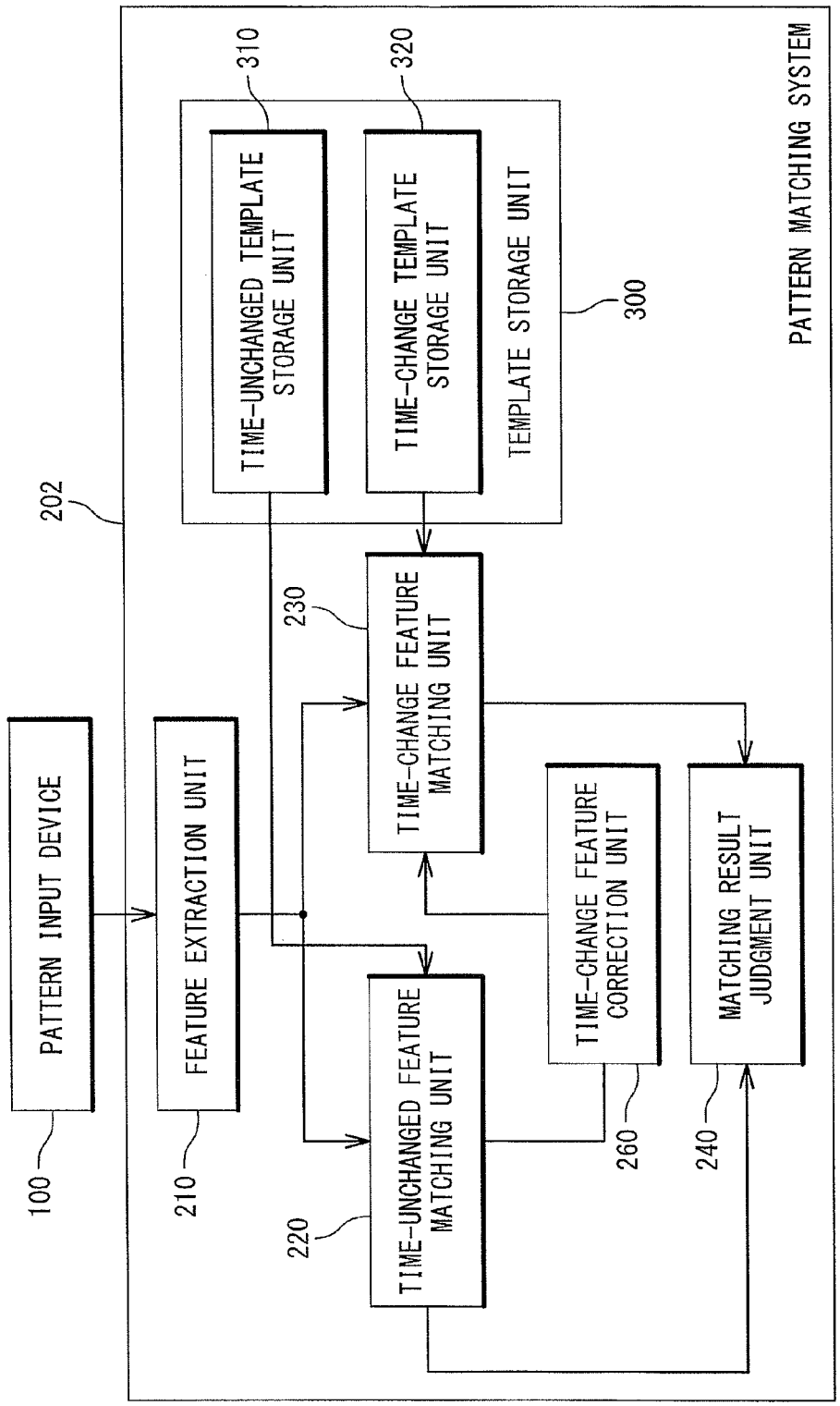
FIG. 7 is a block diagram illustrating a configuration according to a fourth exemplary embodiment of the present invention.
Figure 8:
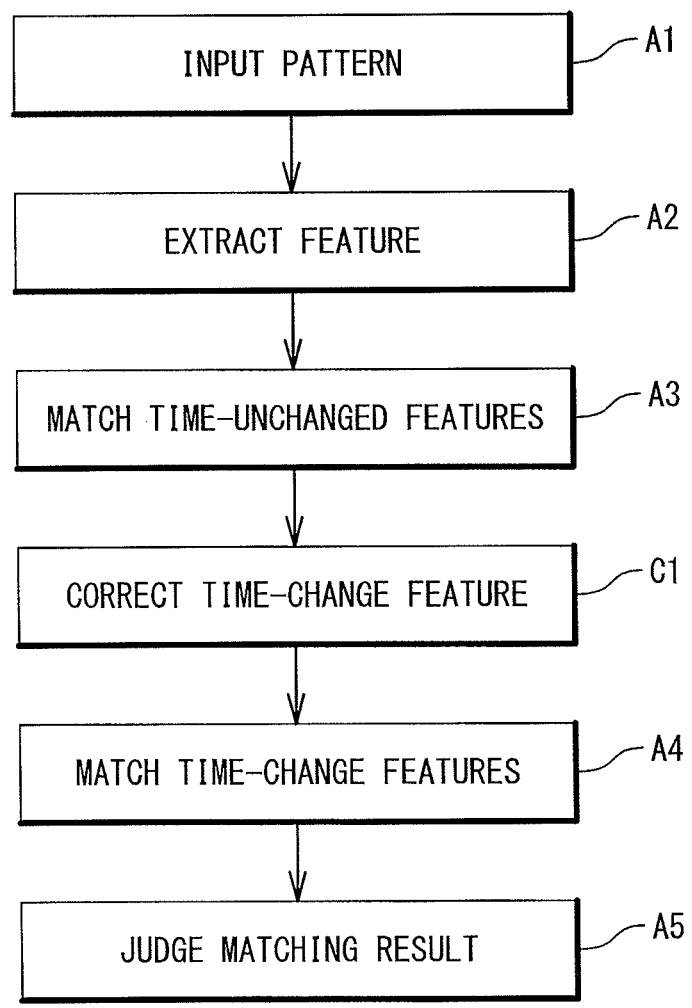
FIG. 8 is a flowchart illustrating operation according to the fourth exemplary embodiment of the present invention.

Next, still another exemplary embodiment of the present invention is described in detail referring to FIGS. 7 and 8. Referring to FIG. 7, a pattern matching system 202 according to a fourth exemplary embodiment of the present invention has a configuration in which a time-change feature correction unit 260 is added to the pattern matching system 200 according to the second exemplary embodiment. The time-change feature correction unit 260 extracts, based on a matching result of the time-unchanged feature by the time-unchanged feature matching unit 220, an influence appearing in common to the entire pattern, such as displacement, deformation or the like of pattern, and generates correction data for correcting the time-change feature to suit the influence appearing in common to the entire pattern.

Referring to a configuration diagram of FIG. 7 and a flowchart of FIG. 8, the entire operation of the fourth exemplary embodiment is described in detail. Referring to the flowchart of FIG. 8, the entire operation according to the fourth exemplary embodiment is operation in which the flowchart of FIG. 4 is inserted with Step C1 of correcting time-change feature. When the matching result of the time-unchanged feature is obtained in Step A3 in FIG. 8, according to the fourth exemplary embodiment, the influence appearing in common to the entire pattern, such as displacement, deformation or the like of pattern, or an influence appearing in common to both of the time-change feature and the time-unchanged feature is extracted, and the time-change feature is corrected to suit the influence appearing in common (Step C1 in FIG. 8).

Advantages of the fourth exemplary embodiment are described. According to the fourth exemplary embodiment, after the time-unchanged feature matching unit 220 matches the time-unchanged features, the time-change feature correction unit 260 extracts, based on the result of the matching, the influence appearing in common to the entire pattern, such as displacement, deformation or the like of pattern, or the influence appearing in common to both of the time-change feature and the time-unchanged feature, and generates the correction data for correcting the time-change feature to suit the influence. For this reason, the time-change feature matching unit 230 substantially handles only feature change due to time change, and can perform matching without being affected by the influence appearing in common to the entire pattern.

(Fifth Exemplary Embodiment)

Figure 9:
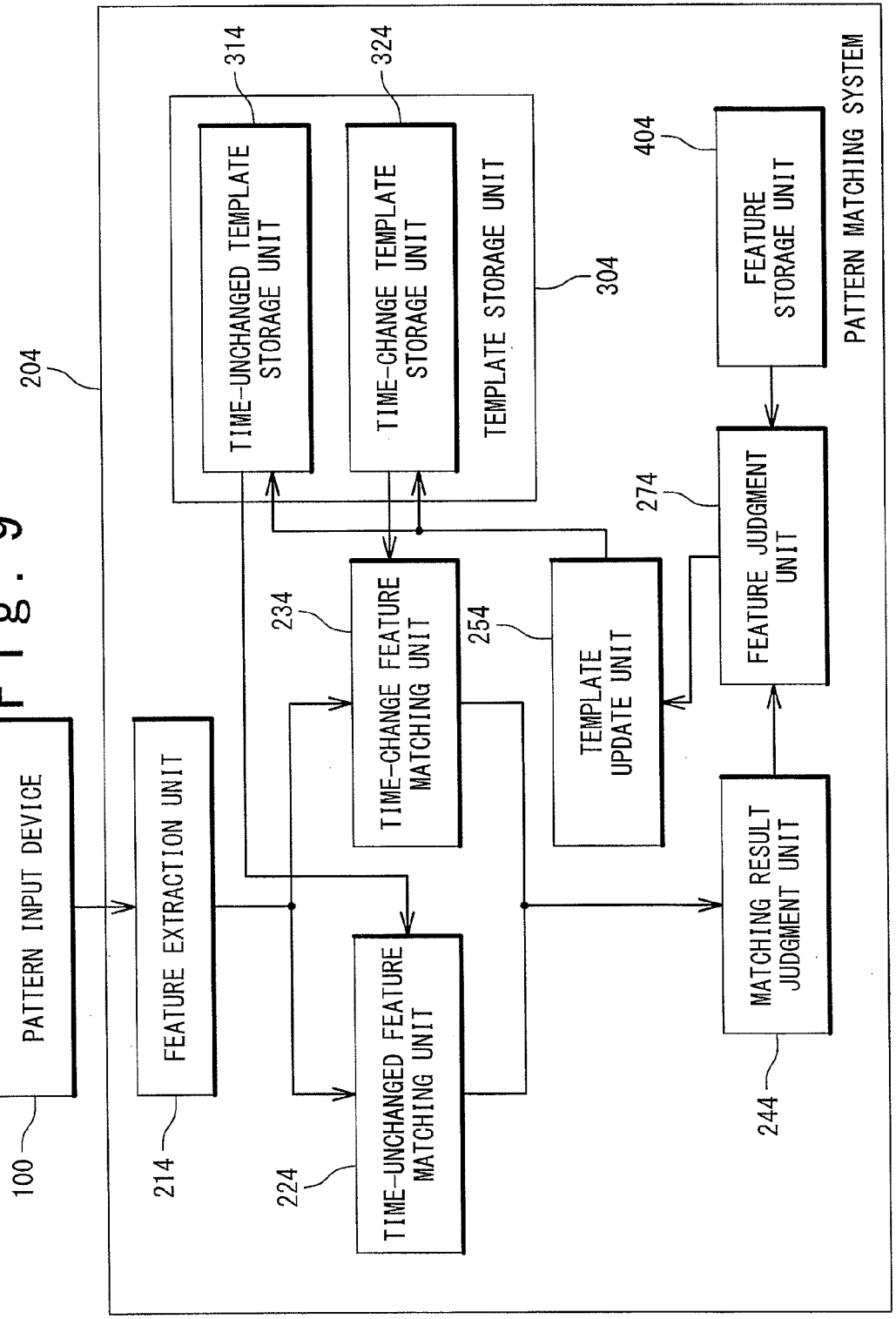
FIG. 9 is a block diagram illustrating a configuration according to a fifth exemplary embodiment of the present invention.
Figure 10:
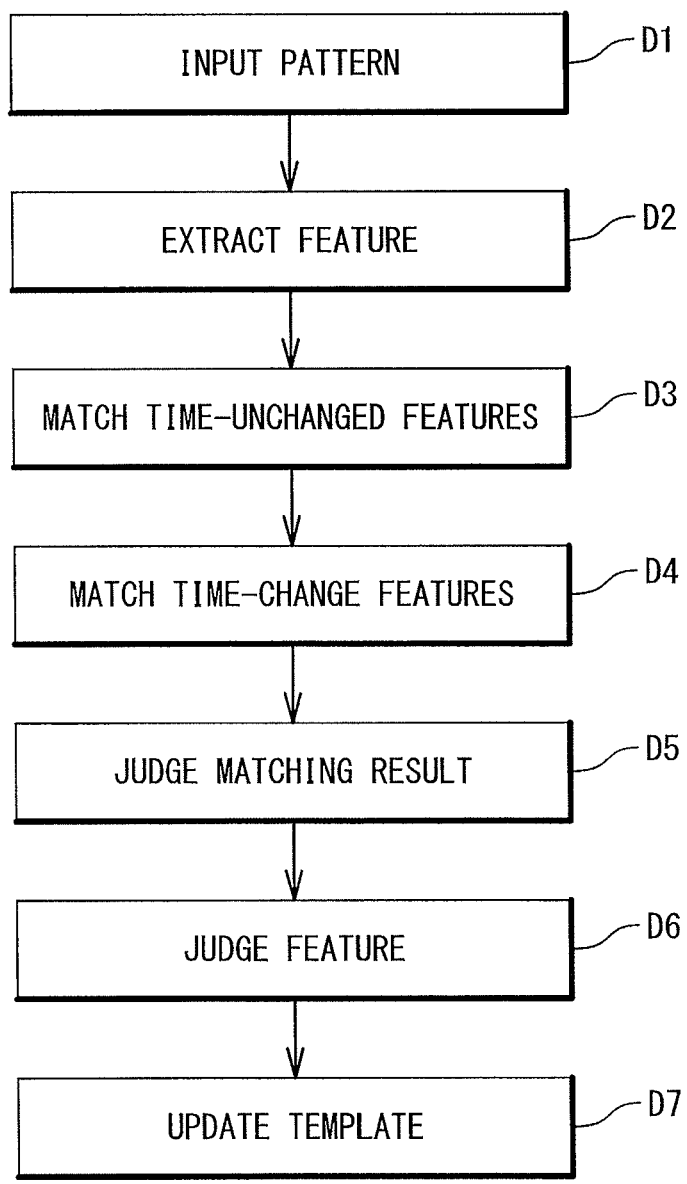
FIG. 10 is a flowchart illustrating operation according to the fifth exemplary embodiment of the present invention.

Next, still another exemplary embodiment of the present invention is described in detail referring to FIGS. 9 and 10. Referring to FIG. 9, a pattern matching system 204 according to a fifth exemplary embodiment of the present invention includes a template storage unit 304, a feature storage unit 404, a feature extraction unit 214, a time-unchanged feature matching unit 224, a time-change feature matching unit 234, a matching result judgment unit 224, a feature judgment unit 274, and a template update unit 254. The template storage unit 304 includes a time-unchanged template storage unit 314 and a time-change template storage unit 324. The feature extraction unit 214, the time-unchanged feature matching unit 224, the time-change feature matching unit 234, the matching result judgment unit 224, the feature judgment unit 274, and the template update unit 254 can be implemented by a computer that operates based on a program control in accordance with a pattern matching program. The template storage unit 304 and the feature storage unit 404 can be provided in a storage device connected to the computer. As shown in FIG. 9, the pattern matching system 204 is connected to the pattern input device 100.

In FIG. 9, the time-unchanged template storage unit 314 stores, among features of a template pattern, a feature that does not change with time. The time-change template storage unit 324 stores, among the features of the template pattern, a feature that may change with time as well as a feature that changes with time. The feature storage unit 404 stores features of the input pattern that is judged to have identity by the matching result judgment unit 224. When the input pattern is judged to have identity by the matching result judgment unit 224, the feature judgment unit 274 refers to the feature storage unit 404 to judge whether each of the features of the template pattern is a feature that changes with time, a feature that does not change with time, or a feature that cannot be determined to be any of the two. When there is a feature that is judged to be a feature not changing with time by the feature judgment unit 274, the template update unit 254 moves the feature from the time-change template storage unit 324 to the time-unchanged template storage unit 314 to update the template storage unit 304.

Referring to a configuration diagram of FIG. 9 and a flowchart of FIG. 10, the entire operation according to the fifth exemplary embodiment is described in detail. First, when the pattern input device 100 inputs a pattern to be matched (Step D1 in FIG. 10), the feature extraction unit 214 extracts features of the input pattern, which are to be used for matching (Step D2 in FIG. 10). The time-unchanged feature matching unit 224 matches the extracted feature with the time-unchanged feature of the template pattern, which is stored in the time-unchanged template storage unit 314 (Step D3 in FIG. 10). The time-change feature matching unit 234 matches the extracted feature with the time-change feature of the template, which is stored in the time-change template storage unit 324 (Step D4 in FIG. 10). The matching result judgment unit 224 judges based on the matching result of the time-unchanged feature matching unit 224 and the matching result of the time-change feature matching unit 234, whether or not the input pattern and the template pattern have identity (Step D5 in FIG. 10).

When the input pattern and the template pattern are judged to have identity, the feature judgment unit 274 judges, based on a feature history stored in the feature storage unit 404, whether each of the features of the template pattern is a feature that does not change with time, a feature that changes with time, or a feature that cannot be determined to be any of the two (Step D6 in FIG. 10). When there is a feature that is newly judged to be a feature not changing with time by the feature judgment unit 274, the template update unit 274 updates the template storage unit 304 (Step D7 in FIG. 10). On the other hand, when the matching result judgment unit 224 judges that the input pattern and the template pattern have identity, the feature storage unit 404 obtains and additionally stores the input pattern. Note that, similarly to the second exemplary embodiment, an order of Steps D3 and D4 in FIG. 10 may be different from that shown in FIG. 10.

Advantages of the fifth exemplary embodiment are described. According to the fifth exemplary embodiment, by repeating the matching, features of input patterns are accumulated in the feature storage unit 404. The feature judgment unit 274 judges whether a feature is the feature not changing with time based on the features of the input patterns. Then, the template update unit 254 automatically classifies the features of the template into the feature changing with time and the feature not changing with time. For this reason, even when the feature extraction unit 214 cannot judge whether a feature is the feature changing with time or the feature not changing with time based on prior knowledge, matching can be performed with distinguishing between the feature changing with time and the feature not changing with time.

First Example

With use of specific examples, the present invention is described in detail. First, referring to FIGS. 11 to 16, a first example corresponding to the second exemplary embodiment is described. In the first example, the pattern matching system according to the present invention is applied to a finger authentication device that checks whether or not registered template data on a finger surface pattern and inputted input data on a finger surface pattern are data on an identical finger. A finger surface pattern is a pattern in which a pattern of fingerprint ridges, a pattern of wrinkles, a pattern of scars, a pattern of hand roughness, and the like are combined. Among these patterns, although the pattern of fingerprint ridges is considered not to change with time, the pattern of wrinkles, the pattern of scars, the pattern of hand roughness and the like are considered to change with time. In the first example, among features of the finger surface pattern, a feature derived from the fingerprint ridges is handled as a time-unchanged feature that does not change with time, and the other features are handled as time-change features that may change with time.

Figure 11:
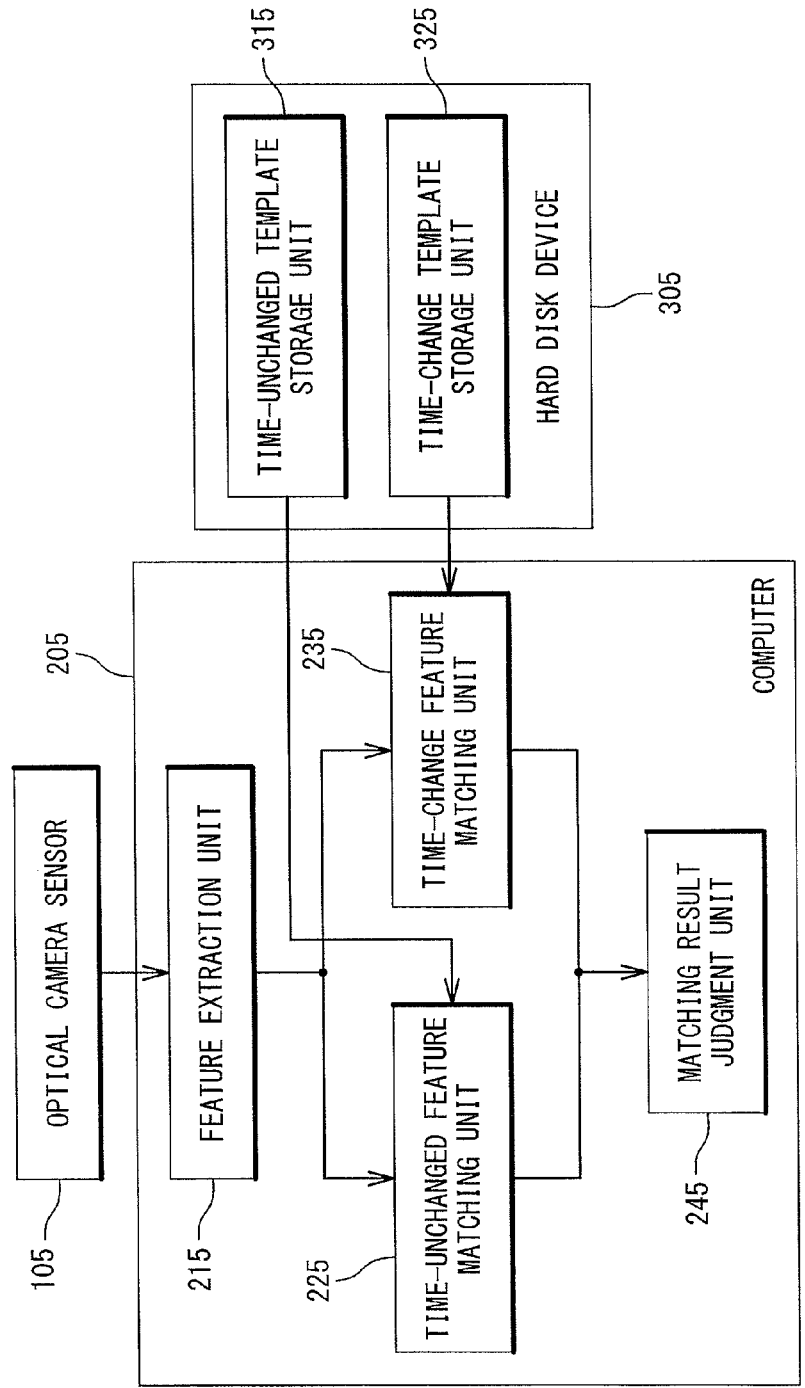
FIG. 11 shows a configuration according to a first example of the present invention.

As shown in FIG. 11, a pattern matching system according to the first example includes a computer 205 and a hard disk device 305. The computer 205 operates based on a pattern matching program. The computer 205 implements a feature extraction unit 215, a time-unchanged feature matching unit 225, a time-change feature matching unit 235, and a matching result judgment unit 245 based on the pattern matching program. The hard disk device 305 functions as a template storage unit that stores a template pattern, and includes a time-unchanged template storage unit 315 and a time-change template storage unit 325. The time-unchanged template storage unit 315 stores the time-unchanged feature of the template, which is derived from fingerprint ridges of a finger. On the other hand, the time-change template storage unit 325 stores the time-change feature which is derived from scars, wrinkles, hand roughness, and the like. As shown in the figure, the computer 205 is connected to an optical camera sensor 105 and the hard disk device 305. The optical camera sensor 105 functions as a pattern input device.

In FIG. 11, from the optical camera sensor 105, a finger surface pattern of a finger, which is to be judged whether or not to be identical to a registered finger, is inputted. The feature extraction unit 215 extracts, from the inputted finger surface pattern, the time-unchanged feature derived from fingerprint ridges and the time-change features derived from scars, wrinkles, hand roughness and the like. The time-unchanged feature matching unit 225 matches the time-unchanged feature of the inputted finger surface pattern with the time-unchanged feature of the finger surface pattern of the template, which is stored in the time-unchanged template storage unit 315. The time-change feature matching unit 235 matches the time-change feature of the inputted finger surface pattern with the time-change feature of the finger surface pattern of the template, which is stored in the time-change template storage unit 325. The matching result judgment unit 245 judges whether or not the inputted finger surface pattern and the registered template finger surface pattern are an identical finger surface pattern based on a matching degree between the time-unchanged features and a matching degree between the time-change features.

Figure 12:
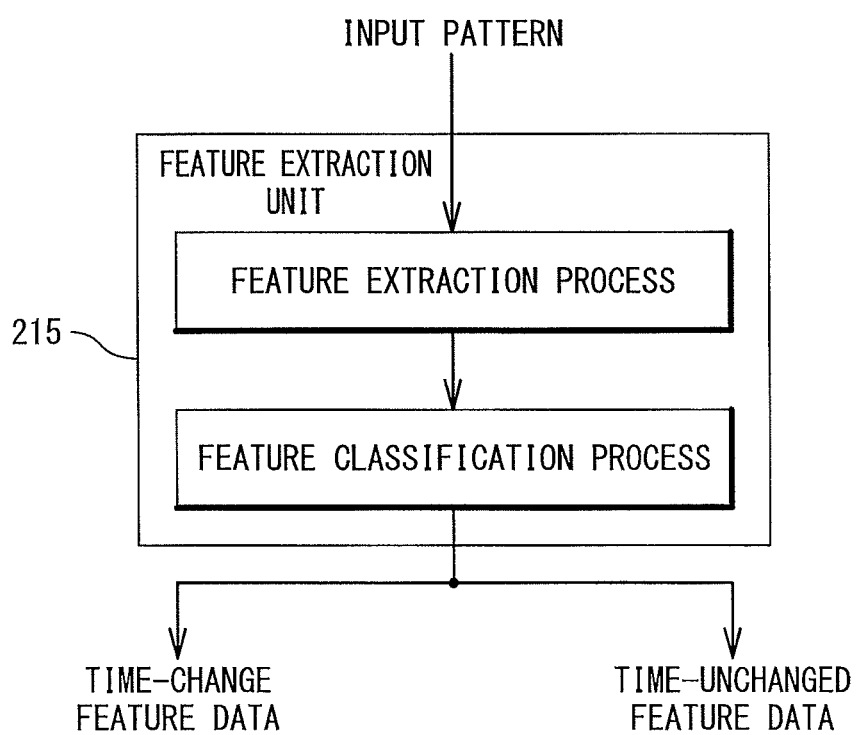
FIG. 12 illustrates an example of a feature extraction unit.

The feature extraction unit 215 according to the first example is described in detail. As illustrated in FIG. 12, the feature extraction unit 215 can extract all pieces of feature data from the input pattern and then classifies the pieces of feature data into time-unchanged feature data and time-change feature data.

Figure 13:
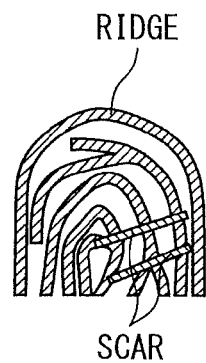
FIG. 13 shows an example of a finger surface pattern.
Figure 14:
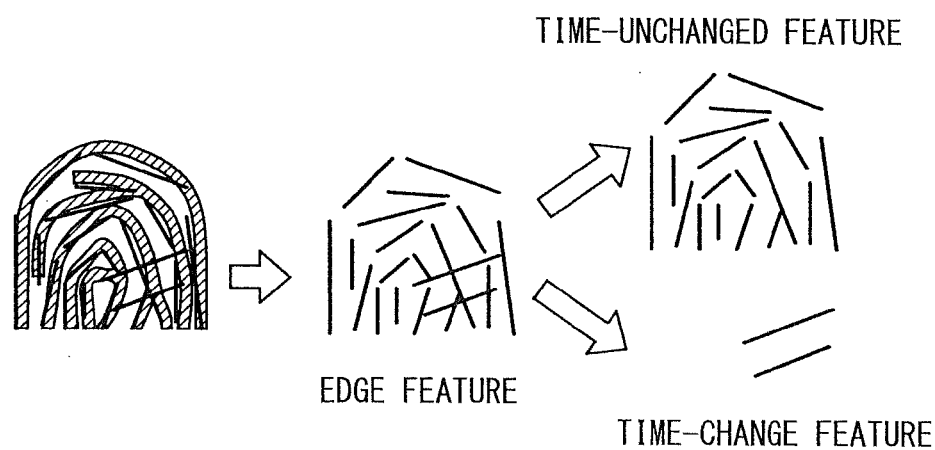
FIG. 14 illustrates an example of a feature extraction method.

For example, it is assumed that a finger surface pattern as shown in FIG. 13 is given as the input pattern. The input pattern includes fingerprint ridges as time-unchanged features and scars as time-change features. As illustrated in FIG. 14, the feature extraction unit 215 first extracts edge features from a whole of the inputted finger surface pattern. Then, the feature extraction unit 215 can classify the feature data by judging whether each of the edge features is an edge feature of fingerprint ridge or the other edge feature.

Figures 15, 16:
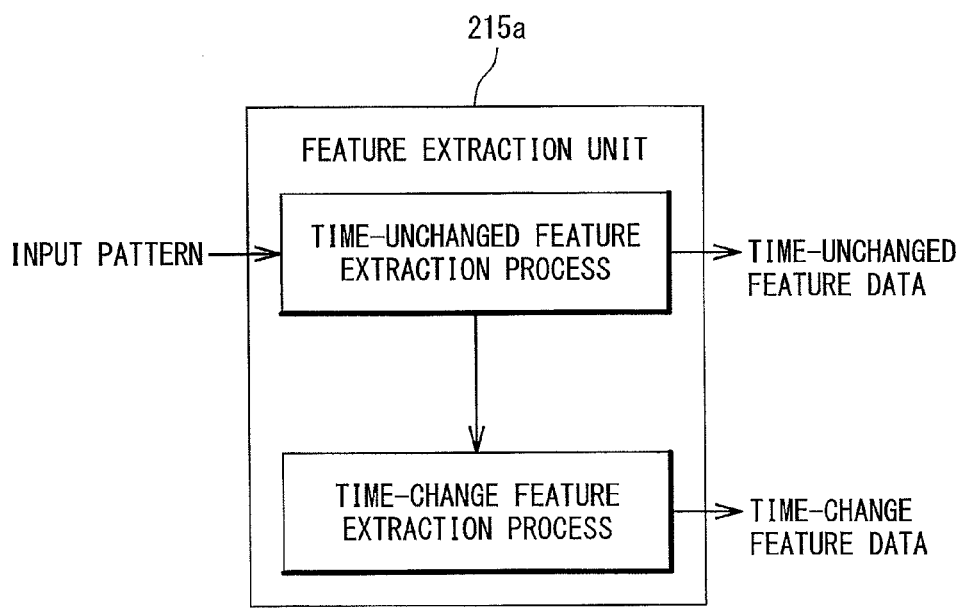
FIG. 15 illustrates another example of the feature extraction unit.
FIG. 16 shows an example of a database that stores a template.
Figure 17:
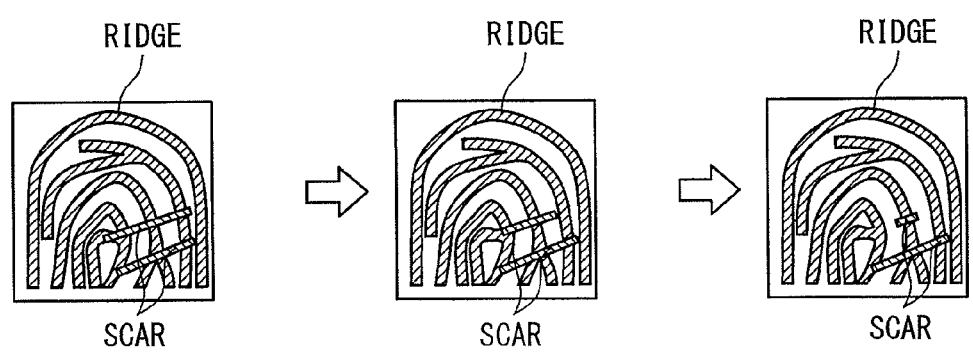
FIG. 17 illustrates an example of time change of features.

FIG. 15 shows a modified example of the feature extraction unit 215. A feature extraction unit 215*a* in FIG. 15 uses prior knowledge on time-unchanged feature and time-change feature to directly extract time-unchanged features and time-change features from the input pattern. For example, as indicated by arrows in FIG. 15, the feature extraction unit 215*a* can extract features of fingerprint ridges from an inputted finger surface pattern with use of the method described in Japanese patent publication (JP-A-Heisei 9-167230), and then extract features other than the features of the fingerprint ridges from the finger surface pattern.

The time-unchanged feature matching unit 225 and the time-change feature matching unit 235 can express features with use of any of the same method and different methods. The time-unchanged feature and the time-change feature are not necessarily expressed with use of the same expression method. For example, the feature of fingerprint ridge as the time-unchanged feature and the feature of pattern of wrinkle, scar, or hand roughness as the time-change feature can be commonly expressed as line; or the feature of fingerprint ridge can be expressed with being symbolized as endpoints and branch points of the ridge and the pattern of wrinkle, scar, or hand roughness can be directly expressed as image information. Similarly, the matching result judgment unit 240 can judge a matching result by the time-unchanged feature matching unit 225 and a matching result by the time-change feature matching unit 235 in any of the same method and different methods. For example, it is possible that stability of judgment is improved by symbolizing information on the fingerprint ridge as point information on branch points and end points of ridge to perform judgment and that judgment is directly performed without symbolization since the features changing with time includes various features.

The matching result judgment unit 240 can use parameters defining a range of identity to perform judgment. In this case, a matching result by the time-unchanged feature matching unit 225 and a matching result by the time-change feature matching unit 235 can be judged with use of the same parameters or different parameters. For example, the feature not changing with time is stable for each input, and therefore strictly judged with use of parameters having tight thresholds. On the other hand, since change with time is required to be considered in the case of the feature changing with time, the feature changing with time is judged with use of parameters having thresholds looser than those in the case of matching of the time-unchanged feature.

Further, the matching result judgment unit 240 can determine parameters depending on an elapsed time from the time of template generation to the time of matching. When the elapsed time from the time of template generation to the time of matching is short, the change in the time-change feature is small, and therefore the judgment is performed with used of parameters having tight thresholds as in the case of the time-unchanged feature. When the elapsed time from the time of template generation to the time of matching is long, the change in the time-change feature is large, and therefore the judgment is performed with used of parameters having loose thresholds. By using parameters having looser thresholds for the case of the longer elapsed time from the time of template generation to the time of matching, the judgment can be performed in accordance with a degree of change in the time-change feature.

As has been described in the first example, the feature extraction unit 215 extracts the time-unchanged feature and the time-change feature with distinguishing them. However, the feature extraction unit 215 may extract features to be used for matching without distinguishing the time-unchanged feature and the time-change feature. When the feature extraction unit 215 does not distinguish between the time-unchanged feature and the time-change feature, the time-unchanged feature matching unit 225 compares all features to be used for matching with the time-unchanged feature in the time-unchanged template storage unit 315 and judges a coinciding feature to be a time-unchanged feature. It is also possible that the time-change feature matching unit 235 compares all features to be used for matching with the time-change feature in the time-change template storage unit 325 and judges a coinciding feature to be a time-change feature.

The matching result judgment unit 245 judges that those have identity, for example, when both of a degree of the matching between the time-unchanged features, which is obtained by the time-unchanged feature matching unit 225, and a degree of the matching between the time-change features, which is obtained by the time-change feature matching unit 235, are equal to or more than a predetermined value. Alternatively, the judgment can be carried out based on a product or sum of the degree of the matching between the time-unchanged features and the degree of the matching between the time-change features, or based on a value which is obtained by substituting those into a predetermined judgment function.

When two patterns to be matched are identical patterns, the degree of matching between time-unchanged features are predicted to be high. Therefore, when a degree of the matching between the time-unchanged features, which is obtained by the time-unchanged feature matching unit 225, is lower than a predetermined value, the two patterns can be judged to be different patterns without obtaining a degree of the matching between the time-change features by the time-change feature matching unit 235.

Between different patterns, a degree of matching between time-unchanged features is not very high. Therefore, when a degree of the matching between the time-unchanged features, which is obtained by the time-unchanged feature matching unit 225, is higher than a predetermined value, the two patterns can be judged to be identical patterns without obtaining a degree of the matching between the time-change features by the time-change feature matching unit 235.

In the first example, the optical camera sensor 105 is used as the pattern input device; however, arbitrary sensor can be used, such as a capacitance sensor, a pressure sensor, a thermal sensor, or a magnetic sensor.

In the first example, the template storage units are provided in the hard disk device 305; however, they can be provided in arbitrary storage device such as a memory or an IC card. Also, in the first example, the hard disk device 305 is provided outside the computer 205; however, it can be provided inside the computer 205 or can be a removable portable medium such as an IC card.

In the first example, the pattern is directly inputted and the feature extraction unit 215 in the computer 205 extracts the features; however, it is possible that another device carries out the processes from the pattern input to the feature extraction and the extracted features are directly inputted. In such a case, the feature extraction unit 215 in the computer 205 only sends the inputted features to the time-unchanged feature matching unit 225 and the time-change feature matching unit 235 without carrying out any process.

In the first example, the finger surface pattern is used as a pattern to be matched; however, another pattern can also be used. For example, another biometric pattern such as a face pattern or a vein pattern, or a geographical pattern such as an aerial photograph can be used. In the case of using the face pattern, a feature derived from bones such as a position of cheekbone or a tip of nose can be used as the time-unchanged feature and a feature of skin such as a mole or a wrinkle can be used as the time-change feature. In the case of using the vein pattern, a thick vein can be used as the time-unchanged feature and a thin vein branched from the thick vein can be used as the time-change feature. In the case of using the geographical pattern, an unchanged pattern such as a trunk road can be used as the time-unchanged feature and a changing pattern such as a tree can be used as the time-change feature.

According to the first example, features of fingerprint ridges, which do not change with time, and features due to scars, wrinkles or hand roughness, which change with time, are separately matched, and therefore, the matching can be stably carried out even when the finger surface pattern changes with time.

In the first example, the time-unchanged features and the time-change features are separately stored in the time-unchanged template storage unit 315 and the time-change template storage unit 325, respectively. However, as illustrated in FIG. 16, the time-unchanged features and the time-change features can be stored in a single storage unit, as a single database provided with property information indicating whether a feature changes with time or does not change with time.

Further, in the first example, the time-unchanged features and the time-change features are matched with use of the different blocks of the time-unchanged feature matching unit 225 and the time-change feature matching unit 235. However, it is possible that a single matching unit changes modes or the like to switch between the two matching functions based on the property information indicating whether a feature changes with time or not.

When the time-unchanged features and the time-change features are stored in the single storage unit, as the single database provided with property information indicating whether a feature changes with time or does not change with time and the single matching unit changes matching modes or the like to switch between the two matching functions based on the property information indicating whether a feature changes with time or not, an example corresponding to the first exemplary embodiment is provided. That is, according to the example corresponding to the first exemplary embodiment, as shown in FIG. 16, line features of a template pattern is stored in the template storage unit. In the figure, each record records: a feature number that identifies the feature; a initial point coordinate position and an end point coordinate position of a line; and property information indicating whether or not the feature changes with time. The matching unit carries out matching in a mode corresponding to the time-change property information.

Second Example

Next, referring to FIGS. 17 to 20, a second example corresponding to the third exemplary embodiment is described. According to the third exemplary embodiment, as shown in FIG. 5, there is provided the template update unit 250 that updates the template storage unit 302. The template update unit 250 updates a time-change feature of a template pattern, which is stored in the time-change template storage unit 322, with use of a time-change feature of the input pattern every time when matching is performed.

Figure 18:
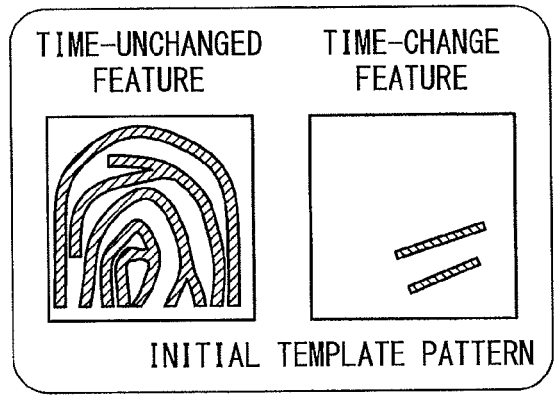
FIG. 18 shows an example of a template pattern.
Figure 19:
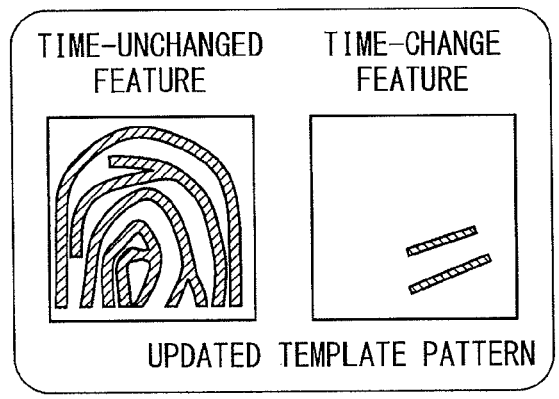
FIG. 19 shows an example of an updated template pattern.
Figure 20:
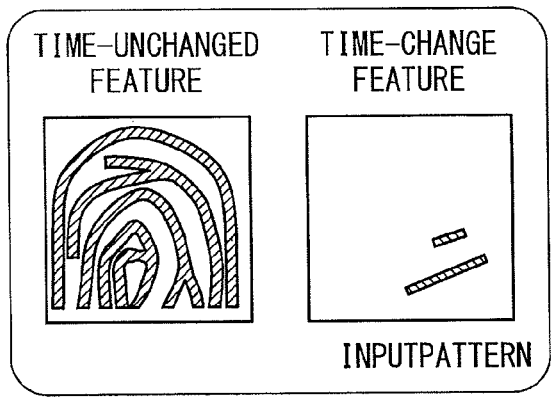
FIG. 20 shows an example of an input pattern.

A case is considered in which a fingerprint ridge feature is used as the time-unchanged feature and a feature due to finger surface roughness is used as the time-change feature. In this case, as indicated by arrows in FIG. 17, the ridge feature does not change with time; however, the feature due to roughness or scars changes with time. It is assumed that FIG. 18 shows time-unchanged features and time-change features of a template when the template is registered at first. When patterns are judged to be identical in the matching and the judgment, the template update unit 250 updates the template only for the time-change features as shown in FIG. 19. When a pattern as shown in FIG. 20 is inputted after that, the time-change features of the pattern is largely different from those of the template shown in FIG. 18, which is registered at first, and therefore, the time-change features cannot be judged to be identical. However, as shown in FIG. 19, when the template is updated only for the time-change features, the time-change features can be judged to be identical.

The update of the template may be performed for each matching or for each predetermined number of matching. In a case that the matching result judgment unit 245 judges the two pattern to be identical, it is also possible that update is carried out only in a case that a matching degree obtained in the judgment is larger than a predetermined value so as to reduce a risk of erroneous update in which the template is updated to be a different pattern.

According to the second example, since time-changed features of the template are updated, a matching robust to change with time can be carried out.

Further, it is also possible to predict time-change features at the next matching by recording an update history of the time-change template. For example, when the time-change features have changed from FIG. 18 to FIG. 19 such that an upper line becomes short, the line is predicted to become further shorter at the next matching. In a case that a pattern shown in FIG. 20 is inputted after that, when the line is predicted to be shorter than that shown in FIG. 19, the matching and the judgment can be carried out with a smaller allowable error, and a matching accuracy can be improved as compared with the case without the prediction.

Further, an elapsed time from the last update of the template can be used to predict the change with time. Since a degree of change with time is strongly related to an elapsed time, the prediction can be performed with a high accuracy by using the elapsed time from the last update of the template Third Example Next, a third example corresponding to the fourth exemplary embodiment is described. According to the fourth exemplary embodiment, as shown in FIG. 7, there is provided the time-change feature correction unit 260. The time-change feature correction unit 260 extracts, based on a result of matching of the time-unchanged feature by the time-unchanged feature matching unit 225, an influence appearing in common to the entire pattern, such as rotation, displacement, deformation or the like of pattern, and corrects the time-change feature to suit the influence appearing in common to the entire pattern.

For example, a finger surface pattern is considered. The finger surface pattern is deviated in position for each input to a sensor, or deformed depending on a state of pressing a finger to the sensor at the input. The position deviation can be expressed as rotation or displacement of the entire pattern, and equally influences both the time-unchanged feature such as a fingerprint ridge feature and the time-change feature such as a feature due to wrinkles, scars, or hand roughness. The deformation of the finger at the input also equally influences both the time-unchanged feature such as a fingerprint ridge feature and the time-change feature such as a feature due to wrinkles, scars, or hand roughness.

A difference in the time-unchanged feature between two patterns is a difference due to the rotation, translational displacement or deformation, or a random difference such as a feature extraction error. On the other hand, a difference in the time-change feature is a difference as a sum of a difference due to change with time and a difference due to the rotation, translational displacement or deformation, or a random difference such as a feature extraction error. For this reason, the difference in the time-change feature tends to be larger than the difference in the time-unchanged feature. If all of the differences are included in an error, an allowable error in the judgment becomes too large, and therefore a risk of judging different patterns to be identical increases.

In the third example, the time-change feature correction unit 260 obtains a result of matching of the time-unchanged feature by the time-unchanged feature matching unit 220. Then, based on a correspondence relationship in the time-unchanged feature between two patterns, correction data for correcting an influence such as rotation, translational displacement or deformation, which equally appears in both of the time-unchanged feature and the time-change feature is obtained. Once the correction data is obtained, the time-change feature can be corrected to eliminate, from the time-change feature, an error or the like due to the influence such as rotation, translational displacement or deformation, which equally appears in both of the time-unchanged feature and the time-change feature. The time-change feature correction unit 260 provides the correction data to the time-change feature matching unit 230, and the time-change feature matching unit 230 uses the corrected time-change feature to perform matching.

In the third example, the correction data for correcting a time-change feature itself is generated; however, the correction data may be a correction amount parameter representing a correction amount for the time-change feature. It is also possible that the time-change feature correction unit 260 provides the correction amount parameter to the time-change feature matching unit 230 and that the time-change feature matching unit 230 takes into consideration the correction amount parameter to perform matching.

According to the third example, based on a result of matching of a time-unchanged feature, matching of a time-change feature can be performed with eliminating the influence such as rotation, translational displacement or deformation, which equally appears in both of the time-unchanged feature and the time-change feature. For this reason, the time-change feature can be more strictly matched. Examples of an influence which equally appears in both the time-unchanged feature and the time-change feature may include a change in intensity or density, an influence of a light source and the like in addition to rotation, translational displacement and deformation.

Fourth Example

Next, a fourth example corresponding to the fifth exemplary embodiment is described. According to the first to fourth exemplary embodiments, when the template pattern is stored in the template storage unit, or when the feature extraction unit 210 extracts a feature to be used for matching from the input pattern, it is necessary to determine whether the feature is a time-unchanged feature or a time-change feature.

For example, when the feature extraction unit 210 extracts an edge feature from an inputted finger surface pattern, it may not be determined whether the edge feature is an edge feature that is derived from fingerprint ridges and does not change with time or an edge feature that is due to wrinkles, scars, hand roughness or the like and changes with time. According to the first example, such a feature that cannot be determined whether or not to change with time cannot be used. In the fourth exemplary embodiment, a feature that cannot be determined whether or not to change with time can be used.

According to the fourth example, when the template pattern is registered, a feature that cannot be determined whether or not to change with time is stored in the time-change template storage unit 324. Subsequently, matching is repeated. That is, the feature extraction unit 214 extracts the feature, and the time-unchanged feature matching unit 224 and the time-change feature matching unit 234 perform matching with the template. The feature storage unit 404 stores an input pattern that is judged to have identity as a result of the matching.

The feature judgment unit 274 refers to the feature storage unit 404 at a predetermined timing to check a series of input patterns that are judged to have identity. Then, it is checked whether or not each feature changes with time. For example, the feature judgment unit 274 judges a feature, which has been confirmed not to change for a predetermined period or longer, to be a time-unchanged feature, and notifies the template update unit 254 of this. The template update unit 254 updates the template storage unit 304 by moving the feature that has been newly judged to be the time-unchanged feature from the time-change template storage unit 324 to the time-unchanged template storage unit 314.

The feature storage unit 404 according to the fourth example is configured to store the features of the input pattern; however, the feature storage unit 404 may store a matching result for the input pattern or the input pattern itself. Even in such a case, the feature judgment unit 274 can determine whether or not each feature of a template pattern changes with time by referring to a unit corresponding to the feature storage unit 404.

According to the fourth example, even when whether the feature changes with time or not can not be judged at the template registration, the judgment can be appropriately made by repeating matching.

Although the present invention has been described above in connection with the exemplary embodiments and examples thereof, the present invention is not limited to the above exemplary embodiments and examples. Those skilled in the art can apply various modifications and changes to the configurations and details of the present invention within the scope of the present invention.

This application is based upon and claims the benefit of priority from Japanese Patent Application No. 2008-010818, filed on Jan. 21, 2008, the disclosure of which is incorporated herein its entirely by reference.

The invention claimed is:

1. A pattern matching system comprising:
a template storage unit configured to store a template pattern;
a feature extraction unit configured to extract features of an input pattern; and
a matching unit configured to perform a first matching in which a first feature not changing with time among said features of said input pattern is matched with said template pattern and a second matching other than said first matching, in which a second feature changing with time among said features of said input pattern is matched with said template pattern,
wherein said template pattern storage unit includes:
a time-unchanged template storage unit configured to store a feature which does not change with time among features of said template pattern; and
a time-change template storage unit configure to store a feature which changes with time among said features of said template pattern, and
said matching unit matches said first feature with said feature stored in said time-unchanged template storage unit in said first matching and matches said second feature with said feature stored in said time-change template storage unit in said second matching,
and wherein the pattern matching system further comprises a matching result judgment unit configured to judge whether or not said input pattern and said template pattern have identity based on a first matching result of said first matching and a second matching result of said second matching,
wherein said matching result judgment unit judges said first matching result with use of a first parameter for determining a range of identity and judges said second matching result with use of a second parameter for determining a range of identity, and said second parameter is a different parameter from said first parameter, and
wherein when judging said second matching result, said matching result judgment unit changes said second parameter based on a time interval from storage of said template pattern to an input of said input pattern.

2. The pattern matching system according to claim 1, wherein said matching unit matches said first feature represented by a first representation method when performing said first matching, matches said second feature represented by a second representation method other than said first representation method when performing said second matching, uses as said first representation method, a representation method of symbolizing pattern information into numerical information, and uses as said second representation method, a representation method of representing pattern information as image information,
said matching result judgment unit judges said first matching result with use of a first judgment method corresponding to a matching adapted to said first representation method and judges said second matching result with used of a second judgment method corresponding to a matching adapted to said second representation method.

3. The pattern matching system according to claim 2, further comprising a template update unit,
wherein when said matching result judgment unit judges that an input pattern and a template pattern have identity, said template update unit updates a feature of said template pattern stored in said time-change template storage unit based on said input pattern.

4. The pattern matching system according to claim 2, further comprising a time-change feature correction unit configured to generate correction data for eliminating influences from said second feature based on a matching result of said first matching,
wherein said influences appears in common to said first feature and said second feature, and
said influences include at least one of an influence due to a rotation of an input pattern, an influence due to a translational displacement of an input pattern, an influence due to a deformation of an input pattern, an influence due to difference in intensity and an influence due to difference in density.

5. The pattern matching system according to claim 2, further comprising:
a feature storage unit configured to store information with respect to an input pattern which is judged to have identity with a template pattern;
a feature judgment unit configured to judge whether or not a feature of said template pattern changes with time based on information with respect to a input pattern and information with respect to another input pattern by referring to said feature storage unit; and
a template update unit configured to update said template storage unit based on a judgment result of said feature judgment unit,
wherein said information with respect to said input pattern includes a matching result of judgment of having identity or a feature of said input pattern which is judged to have identity.

6. The pattern matching system according to claim 2, wherein when performing said second matching, said matching unit estimates, based on an input pattern which is judged to have identity with a template pattern in a past, a change with time of said template pattern and matches said second feature with a template pattern with an estimated change with time, said template pattern storage unit stores a finger surface pattern or a face pattern as said template pattern, said feature extraction unit extracts features of an input pattern, which are obtained from a finger surface or a face, and said matching unit performs said first matching in which said first feature is a feature derived from a fingerprint ridge or from a bone and performs said second matching in which said second feature is a feature not derived from a fingerprint ridge or a feature derived from a skin.

7. A pattern matching method comprising:

storing, by using a storage device, a template pattern;

extracting, by using a processor, features of an input pattern; and matching, by using the processor, said features of said input pattern with said template pattern, wherein said matching includes:
performing a first matching in which a first feature not changing with time among said features of said input pattern is matched with said template pattern; and
performing a second matching other than said first matching, in which a second feature changing with time among said features of said input pattern is matched with said template pattern, wherein said storing includes:
storing a feature which does not change with time among features of said template pattern; and
storing a feature which changes with time among said features of said template pattern, and said matching further includes:
matching said first feature with said feature which does not change with time in said performing said first matching; and
matching said second feature with said feature which changes with time in said performing said second matching, and wherein the matching method further comprises judging whether or not said input pattern and said template pattern have identity based on a first matching result of said first matching and a second matching result of said second matching, wherein said judging includes:
judging said first matching result with use of a first parameter for determining a range of identity;
judging said second matching result with use of a second parameter for determining a range of identity; and
changing said second parameter based on a time interval from store of said template pattern to an input of said input pattern when said second judging result is judged, and
said second parameter is a different parameter from said first parameter.

8. The matching method according to claim 7, wherein said matching includes:
matching said first feature represented by a first representation method when said first matching is performed;
matching said second feature represented by a second representation method other than said first representation method;

using as said first representation method, a representation method of symbolizing pattern information into numerical information; and using as said second representation method, a representation method of representing pattern information as image information, and said judging includes:
judging said first matching result with use of a first judgment method corresponding to a matching adapted to said first representation method; and
judging said second matching result with used of a second judgment method corresponding to a matching adapted to said second representation method.

9. A non-transitory computer readable medium which records a pattern matching program that causes a computer to perform a method comprising:

storing a template pattern;

extracting features of an input pattern;

performing a first matching in which a first feature not changing with time among said features of said input pattern is matched with a template pattern stored;

performing a second matching other than said first matching, in which a second feature changing with time among said features of said input pattern is matched with said template pattern; and judging whether or not said input pattern and said template pattern have identity based on a first matching result of said first matching and a second matching result of said second matching, wherein said storing includes:
storing a feature which does not change with time among features of said template pattern; and
storing a feature which changes with time among said features of said template pattern, and said first matching further includes:
matching said first feature with said feature which does not change with time, and said second matching further includes:
matching said second feature with said feature which changes with time, and said judging includes:
judging said first matching result with use of a first parameter for determining a range of identity;
judging said second matching result with use of a second parameter for determining a range of identity; and
changing said second parameter based on a time interval from store of said template pattern to an input of said input pattern when said second judging result is judged, wherein said second parameter is a different parameter from said first parameter.

* * * * *